No. 753,460. PATENTED MAR. 1, 1904.
C. A. WRIGHT.
WINDMILL.
APPLICATION FILED AUG. 20, 1903.
NO MODEL. 5 SHEETS—SHEET 1.

Inventor
Charles A. Wright,

Witnesses
Attorney

No. 753,460. PATENTED MAR. 1, 1904.
C. A. WRIGHT.
WINDMILL.
APPLICATION FILED AUG. 20, 1903.
NO MODEL. 5 SHEETS—SHEET 2.

Witnesses
J. L. McClure
G. S. Roy

Inventor
Charles A. Wright
By D. T. Wolhaupter
Attorney

No. 753,460. PATENTED MAR. 1, 1904.
C. A. WRIGHT.
WINDMILL.
APPLICATION FILED AUG. 20, 1903.
NO MODEL. 5 SHEETS—SHEET 4.

No. 753,460. Patented March 1, 1904.

UNITED STATES PATENT OFFICE.

CHARLES A. WRIGHT, OF ATCHISON, KANSAS.

WINDMILL.

SPECIFICATION forming part of Letters Patent No. 753,460, dated March 1, 1904.

Application filed August 20, 1903. Serial No. 170,220. (No model.)

*To all whom it may concern:*

Be it known that I, CHARLES A. WRIGHT, a citizen of the United States, residing at Atchison, in the county of Atchison and State of Kansas, have invented certain new and useful Improvements in Windmills, of which the following is a specification.

This invention relates to windmills, and has for its object to simplify and improve the construction of windmills generally.

One of the objects of the present invention is to inclose and protect the main working parts of the mill, so as to exclude rain, sleet, sand, and the like, and thereby obtain greater durability of the windmill as a whole.

At the same time the invention has for its object to provide a protecting-casing of such construction and arrangement as to obtain the requisite strength for supporting the other parts of the mill, such as the wheel, the vane, and the several brackets, levers, and the like, through the medium of which motion is communicated from the wheel to the pump rod or pole.

A further object of the invention is to provide a movable furl-weight under such arrangement that it serves the double purpose of forcing the wheel out of sail when the furl connection is released and also sets or applies the brake to the wheel, thereby stopping the latter and preventing the same from oscillating after it is thrown out of the wind.

A further object of the invention is to mount the main shaft of the wind-wheel to one side of the center of the head, so that there is a constant tendency to throw the wheel out of sail, which tendency is counteracted by a governor-spring, which therefore acts to hold the wind-wheel to its work.

A further object of the invention is to provide a special construction of hub and bearing for the wind-wheel, whereby a bearing of greater length is obtained and the wind-wheel balanced so as to obviate a twisting strain on the main axle or shaft.

With the above and other objects in view, the nature of which will more fully appear as the description proceeds, the invention consists in the novel construction, combination, and arrangement of parts, as hereinafter fully described, illustrated, and claimed.

In the accompanying drawings, Fig. 3 is a reverse perspective view of the same. Fig. 11 is a detail diagrammatic view showing the relative positions of the upper and lower pivotal points for the vane.

Like reference-numerals designate corresponding parts in all figures of the drawings.

In the drawings I have represented a tower 1 of the usual construction, to the upper end of which is applied a tower-cap 2, the base portion of which is recessed or flanged to embrace the upper ends of the angle posts or standards $2^a$, forming the tower proper, the said cap being bolted or otherwise secured thereto in the manner illustrated. The cap 2 is provided with an upstanding cylindrical bearing-head 3, provided at the top with a circumferential flange 4, adapted to be engaged by the inwardly-projecting lip 5 of a clamp or keeper 6, which is secured at 7 to the casing of the mill, hereinafter described. (See Fig. 2.)

Figures 2, 5:
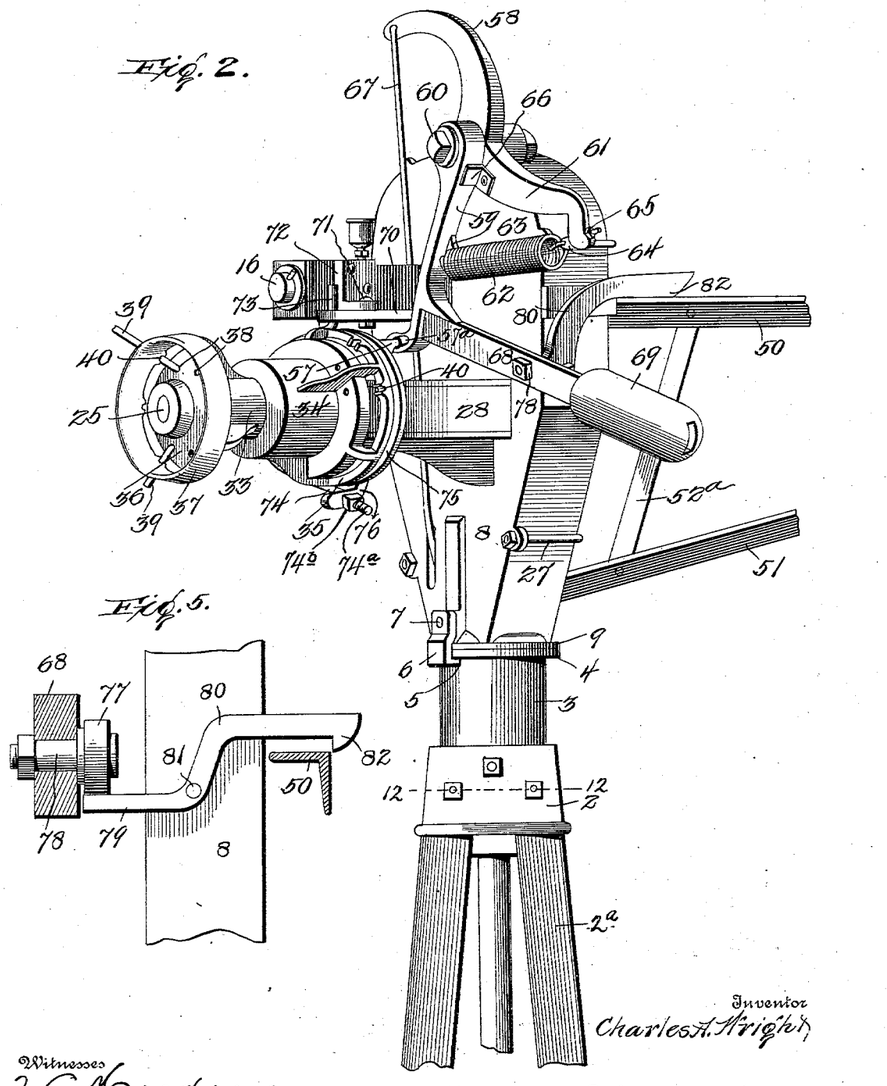
Fig. 2 is an enlarged front perspective view of the mill with portions of the wheel and vane omitted.
Fig. 5 is an enlarged detail sectional elevation showing the means for locking the wheel out of sail.
Figures 4, 10:
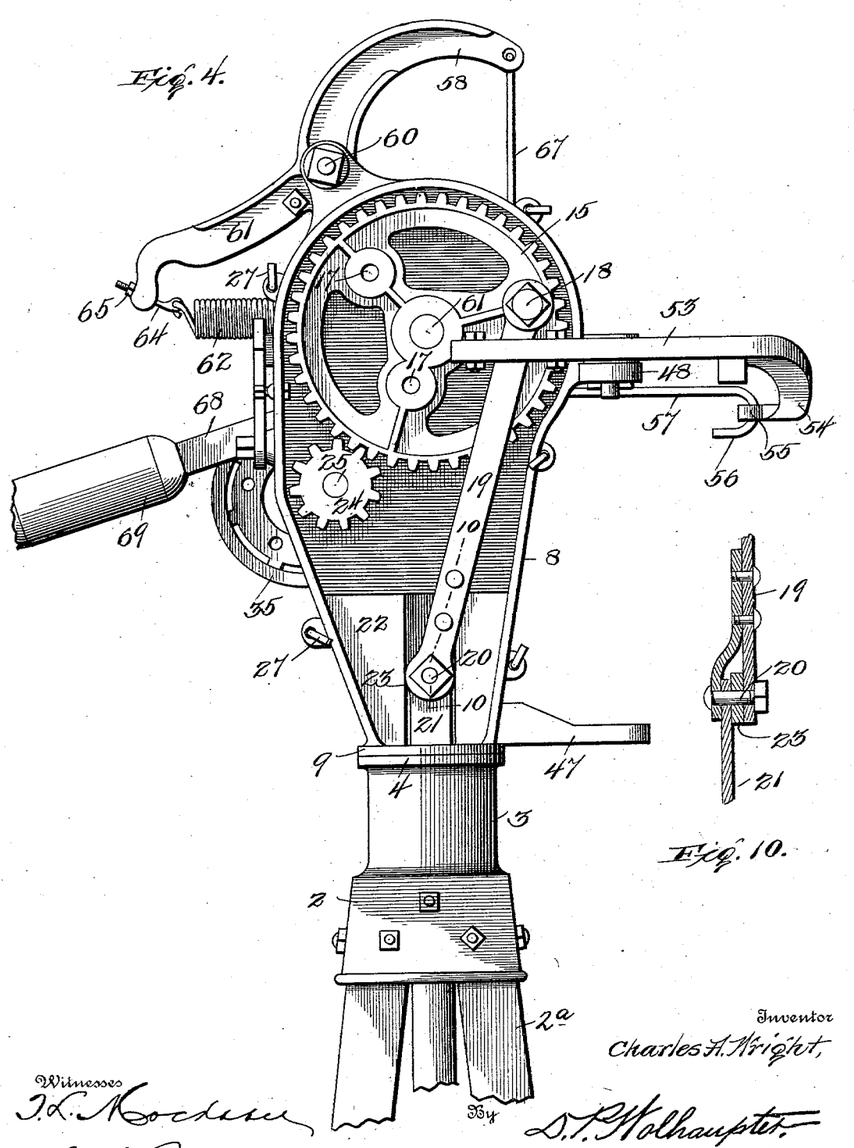
Fig. 4 is a rear elevation of the mill with the adjacent face-plate of the casing removed to show the interior mechanism.
Fig. 10 is a detail section illustrating the connection between the pitman and pump-pole.

The casing 8 is provided at or near its lower end with a circumferential flange 9, corresponding in size and shape to the flange 4 of the bearing-head and resting thereon, as shown in Figs. 2 and 4, the two flanges being held together by means of the clamp or keeper 6.

Figures 6, 7, 8, 9, 12:
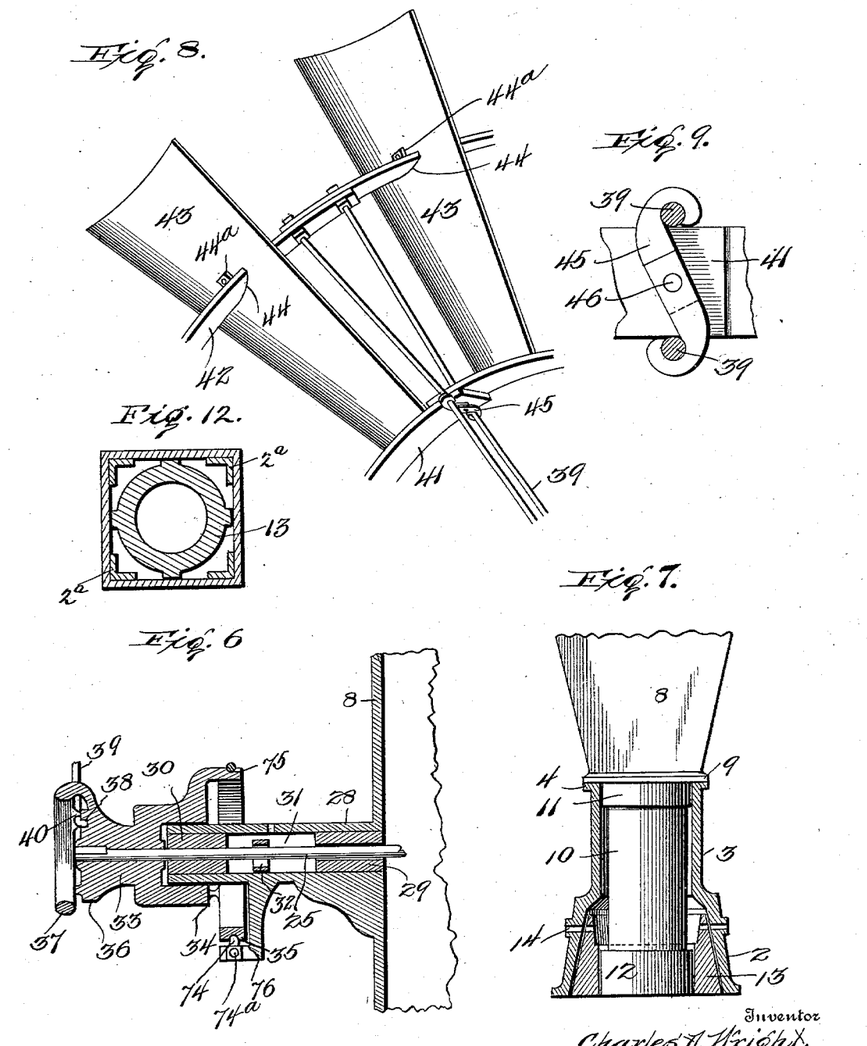
Fig. 6 is a detail section taken longitudinally of the hub of the wind-wheel and the bearing-bracket which supports said wheel.
Fig. 7 is a detail vertical section through the bearing-head of the mill.
Fig. 8 is a fragmentary perspective view of a portion of the wind-wheel, showing the manner of mounting, connecting, and bracing the sails or wings.
Fig. 9 is a detail section showing the cross-ties for connecting the spokes of the wheel.
Fig. 12 is a detail cross-sectional view on the line 12 12 of Fig. 2, showing the cross-sectional form of the bearing-sleeve or bushing to provide clearance for the tower posts or standards which sustain the tower-cap.

By reference to Fig. 7 it will be seen that the casing is provided with a pendent stem 10, which is rotatably mounted in the bearing-head 3, being provided near its upper end with an enlargement or collar 11, which works in contact with the inner surface of the bearing-head. At its lower end the stem 10 is provided with a similar enlargement or collar 12, which works in contact with a bearing-sleeve or bushing 13, the latter being made tapering to fit within the lower portion of the bearing-head 3, where it is secured by means of bolts or other suitable fastenings passing through openings 14 in the bushing and bearing-head. The bushing 13 may be removed when too far worn and replaced by a new one.

The upper portion of the casing 8 is of sufficient size to receive a gear-wheel 15, the same being journaled upon a short stud-shaft 16 and provided with a series of openings 17 at different distances from the center, any one of which is adapted to receive a pitman-bolt 18, by means of which one end of a pitman 19 is pivotally connected with the wheel. The opposite or lower end of the pitman 19 is pivotally connected at 20 to the upper end of the upper pump pole or rod section 21, which reciprocates vertically through the bearing-head and connects with the pump in the usual manner. At each side of the pump-pole section 21 is arranged a grooved guide 22, in connection with which an antifriction-roller 23 coöperates, said roller being journaled upon the pivot or bolt 20, which connects the pitman 19 with the upper pump-pole section 21. The roller 23 works in the grooved guides 22 and insures vertical rectilineal motion of the pump-pole section 21 with a minimum amount of friction.

Figures 3, 11:
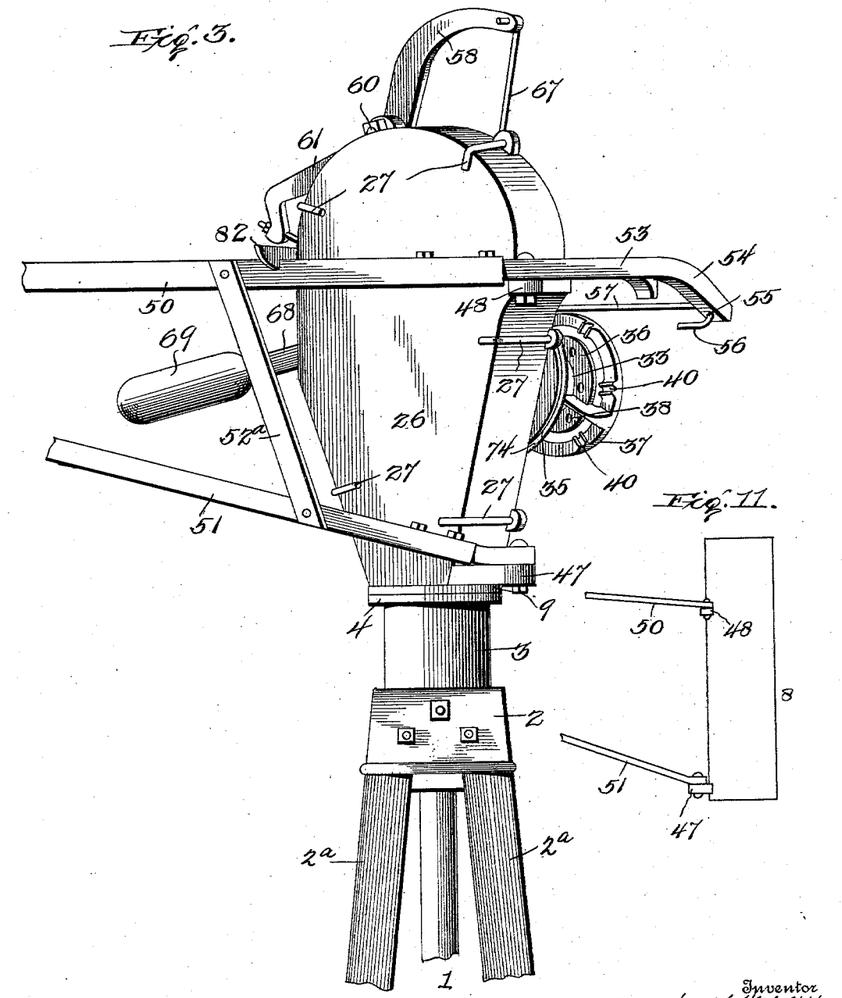

Meshing with the gear-wheel 15 is a pinion 24, which lies within the casing 8 and is mounted upon the inner end of the main shaft or axle 25, which carries the wind-wheel. The casing 8 is permanently closed at one side, while the opposite side is closed by means of a cover 26, held in place by means of angle bolts or keepers 27, as best illustrated in Fig. 3. The cover 26 protects the gearing from rain, sleet, sand, and the like and at the same time may be readily removed for giving access to the mechanism contained in the casing.

Projecting forward from the opposite or front side of the casing 8 is a bracket 28, through which passes the shaft 25. The bracket 28 is of hollow construction, adapting it to receive a pair of bushings 29 and 30, arranged, respectively, at the inner and outer ends thereof, so as to provide two distinctly-located bearings for the main shaft or axle 25, as best illustrated in Fig. 6. The space 31 between the bushings forms an oil-chamber for containing a lubricating material, by means of which the main shaft may be constantly lubricated. The oil-lifting ring 32 is connected with the shaft 25, as shown in Fig. 6, said ring revolving within the oil-chamber and serving to elevate and agitate the oil and cause the same to be distributed to both of the bearings or bushings 29.

Upon the outer end of the shaft 25 is mounted the hub 33 of the wind-wheel. The hub comprises an inner flange 34 and an inner rim 35, also an outer flange 36 and an outer rim 37. The flanges 34 and 36 are provided with holes or sockets 38 to receive the bent inner ends of the wheel-spokes 39, while the rims 35 and 37 are provided, as shown in Fig. 2, with notches 40 to receive the spokes radiating from the wheel-hub, the notches 40 being located substantially in radial alinement with the sockets or holes 38, whereby the spokes are braced relatively to the hub and the strength of the wheel materially increased.

Figure 1:
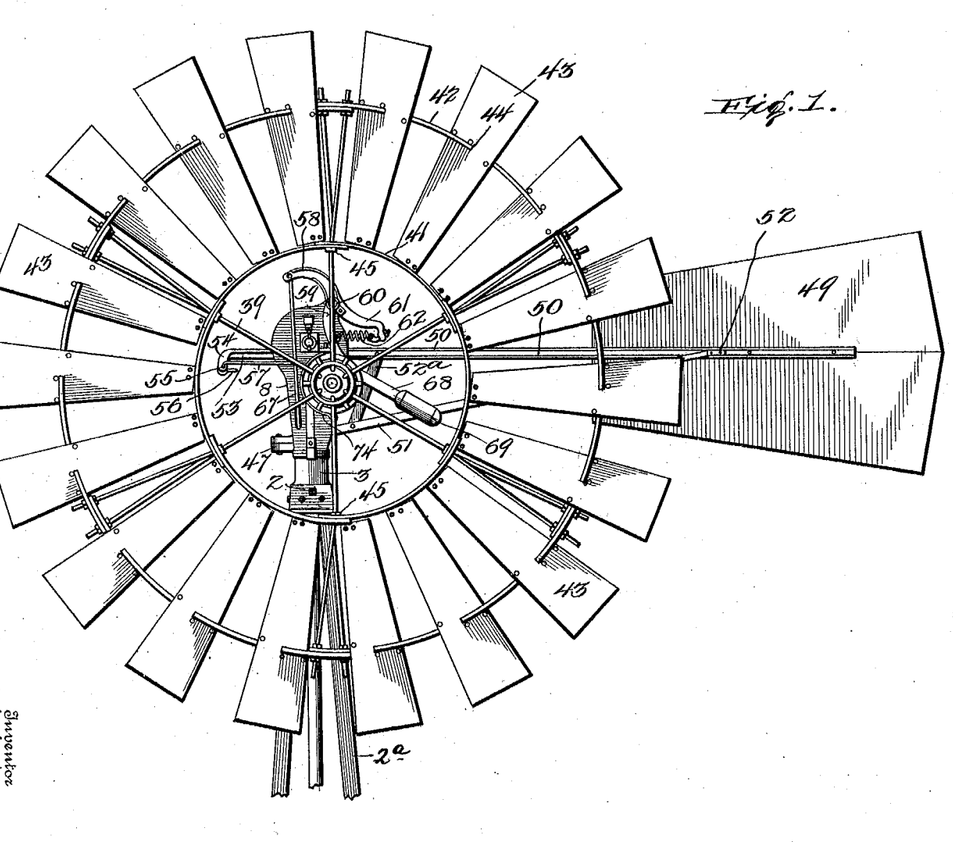
Figure 1 is a front elevation of a windmill constructed in accordance with the present invention, showing the same out of sail.

The wheel comprises an inner band 41 and an outer band 42, to which the sails or wings 43 are secured. The inner end of each sail or wing 43 is connected directly to the inner band 41, while the outer band 42 passes through an opening 44 in the sail or wing, as shown in Figs. 1 and 8, the wing being suitably fastened to the outer band. The spokes 39 extend from the hub outward to the inner band 41, either in parallel or crossed relation to each other, and are secured to opposite sides of the band 41 by means of an S-shaped cross-tie 45, (illustrated in detail in Fig. 9 and shown applied in Fig. 8,) said cross-tie being formed in two parts, which overlap at their central portions, the two parts of the tie being connected by a bolt or rivet 46, which also passes through the inner band 41, thereby securing the two parts of the tie together and securing the tie as a whole to the inner band. The hooked outer ends of the cross-tie embrace the spokes 39 and hold the same firmly against the opposite sides or edges of the band 41, as shown in Fig. 8. The spokes extend from thence outward, where they pass through the outer band 42 and are secured thereto by means of nuts or their equivalent. The sails 43 preferably consist of sheet metal, each being given the proper dish and pitch to render the same the most effective.

Each of the bands 41 and 42 is composed of sections with overlapping ends held together by the wheel-spokes, which pass through such overlapping ends and are held by nuts or other suitable fastenings. Where the bands join the blades or wings they are firmly connected thereto by means of angle-brackets 44$^a$, one arm of each bracket being fastened to the wing, while the other arm of the bracket is fastened to the band.

At the point just above the flange 9 of the casing 8 and extending laterally outward from the casing is what I term the "lower" vane-bracket 47, while projecting laterally from the upper portion of the casing 8 is the upper vane-bracket 48. The vane 49 may be of any suitable size and configuration and is mounted upon the vane-frame, which comprises, essentially, a tail-bone 50, the inner end of which is journaled upon the upper bracket 48, and an inclined brace 51, which is rigidly connected at its outer end 52 to the tail-bone and journaled at its inner end on the lower vane-bracket 47.

A feature of advantage to note in connection with the pivotal mounting of the vane is the fact that the upper and lower pivotal points for the vane (designated, respectively, by the letters U and L) are not in vertical alinement, but set one in advance of the plane of the other. By reason of thus arranging the upper and lower pivotal points of the vane out of vertical alinement in the manner stated the tail of the vane is elevated or swung up from the horizontal when in sail, the effect of which is to cause the vane to tend to gravitate to its out-of-sail position. Hence when the vane is released it will quickly and freely move out of sail.

The tail-bone and brace may be connected at one or more points by means of cross-ties 52$^a$, so as to impart the requisite strength thereto. To the inner end of the tail-bone 50 is rigidly connected what I term a "vane-crook" 53, the outer extremity of which is curved in the form of a hook, as shown at 54, and provided at its extremity with an eye 55 to receive the bent extremity 56 of a vane-connecting rod 57, which extends inward along one side of the casing 8 and connects with the lower furl-lever member hereinafter described.

The furl-lever is of duplex construction, comprising the upper furl-lever member 58 and the lower furl-lever member 59. These two members are capable of independent relative movement, but are both mounted or fulcrumed on the same bolt or pivot 60, as shown best in Fig. 2. The member 58 extends upward above the fulcrum, while the member 59 extends downward below the fulcrum.

The upper furl-lever member 58 is provided with an arm or extension 61, which diverges from the lower member 59 when in its normal position, the member 59 being yieldingly connected with the arm or extension 61 by means of a governor-spring 62. One end of this spring is connected to a lug or ear 63 on the member 59, while the opposite end of the spring is connected to a tension or eye bolt 64, which passes through the extremity of the arm or extension 61 and is made adjustable by means of a nut 65 or its equivalent, whereby the tension of the governor-spring may be changed to suit requirements and to afford the desired resistance to throwing the wind-wheel out of sail, the tension of said spring being exerted to hold the wind-wheel in operation. The arm or extension 61 is provided with a stop 66, projecting from one side thereof across the lower furl-lever member 59, so as to prevent the total relaxation of the spring 62.

67 designates the furl-wire connection, which attaches at its upper end to the upper furl-lever member 58 and extends downward within reach of the operator for the purpose of enabling the latter to throw the wind-wheel into operation after the same has been thrown out of operation by excessive wind-power.

Extending laterally outward from the lower furl-lever member 59 is an arm 68, upon the outer end of which is a movable or adjustable furl-weight 69. This weight serves to hold the arm 59 normally in the position shown in Fig. 2, where it rests against the inner end of a brake-lever 70, fulcrumed at 71 intermediate its ends on a bracket 72, connected with and projecting laterally from the casing 8. The opposite or outer end of the lever 70 receives the upturned extremity 73 of a brake rod or band 74, which partially surrounds the hub of the wind-wheel and is received in a groove 75 therein. The opposite or lower end of the brake rod or band 74 is threaded, as indicated at 74$^a$, and passed through an opening in a lug 76, extending downward from the lower side of the main bracket 28, as plainly shown in Figs. 2 and 6 of the drawings. This threaded end portion 74$^a$ receives thereon at one side of the lug 76 a take-up nut or adjusting device 74$^b$, which provides simple and practical means for positively taking up wear or lost motion, and thus permits the brake to be maintained in an operative condition.

It will be seen that as the weighted arm 68 descends in furling the wheel or throwing the same out of sail the lower portion of the lever 59 comes in contact with the brake-lever 70, and thereby applies the brake to the wheel until the latter is brought to a standstill.

Connected with the arm 68 is a latch-operating roller 77, which is journaled on a short shaft 78, carried by said arm. The roller 77 is adapted to move into and out of contact with the foot portion 79 of a latch or lever 80, which is fulcrumed at 81 intermediate its ends on the casing 8, as best shown in Figs. 2 and 5. The latch is provided at its extremity with a hook or lip 82, adapted to engage over the tail-bone 50 of the vane-frame, thereby locking the wind-wheel and vane in parallel relation to each other and holding the wheel out of sail. When the operator pulls upon the connection 67, the upper furl-lever member 58 is rocked through the medium of the governor-spring 62. The lower furl-lever member 59 is also swung so as to release the brake-lever 70 and offset the brake, at the same time carrying the roller 77 into engagement with the foot of the latch-lever 80, which has the effect of disengaging the hook or catch 82 from the tail-bone of the vane-frame, whereupon the wind-wheel is thrown around so as to face the wind, in which position it stands at right angles to the vane.

When the wheel is thrown into sail by means of the furl connection, the normal position of the wheel is perpendicular to the plane of the vane and the axis of the wind-wheel is at right angles to the axis of the head. The wind-wheel is journaled on a shaft which is offset to one side of the center of the head, so that when the wind becomes excessive there is a tendency to revolve the head upon its vertical axis. This tendency would be entirely overcome by the vane if the latter were rigidly connected to the head. This, however, is not the case. The vane is connected by means of a rod with the lower furl-lever member and is held in position by the tension of the governor-spring, so that the exertion of the wind upon the wheel tends to revolve the head, and this tendency is overcome or counteracted by the tension of the governor-spring acting through the different agencies described upon the vane. When the force of the wind becomes sufficient, the governor-spring permits the wind-wheel to swing around into a plane parallel with that of the vane, where it is locked by the latch-lever and remains so locked until released by the operator. The function of the governor-spring is not to pull the wind-wheel out of the wind, but rather to hold it in the wind, and during the variations in the velocity of the wind the spring always acts to force the wheel back to the wind as the velocity of the wind is reduced unless the wind should reach a velocity which would force the wheel into a plane parallel to the vane, in which event the wheel would become locked, as hereinabove described.

It has been explained that the vane-connecting rod 57 extends inward along one side of the casing 8 and connects with the lower furl-lever member 59. At this point in this connection it should be further noted that at the connecting-point between the rod 57 and the lever member 59 the latter is provided with an elongated hole or slot 57ª. This slot is an important feature of the construction, inasmuch as without the same it would be impossible to unlock the vane and throw the wheel into sail. From the foregoing description it is obvious that in order to change the position of the vane and wheel it is first necessary to disengage the lock or latch from the vane or vane-support. This is accomplished by reason of the slot or enlarged opening 57ª, which permits the lower furl-lever member to move a sufficient distance to disengage the lock or latch before the said lower furl-lever member begins to act through the vane-connecting rod 57.

From the foregoing description it will be understood that the wind-wheel and the various parts thereof are susceptible of changes in the form, proportion, and minor details of construction, and I therefore reserve the right to make such changes as properly fall within the scope of the appended claims.

Having thus described the invention, what is claimed, and desired to be secured by Letters Patent, is—

1. A windmill comprising a head journaled on a vertical axis, a vane pivotally connected with the head, a wind-wheel mounted on a shaft located at one side of the vertical axis of the head, a furl-lever mounted upon the head and having a connection with the vane, and a self-acting lock controlled by the furl-lever and arranged to have an automatic locking engagement directly with the vane when the latter and the wheel are brought into parallel relation.

2. A windmill comprising a head journaled on a vertical axis, a vane pivotally connected with the head, a wind-wheel mounted on a shaft located at one side of the vertical axis of the head, a furl-lever element, a yielding connection between said furl-lever element and the vane, and self-acting locking means controlled by the furl-lever element and arranged to have an automatic locking engagement directly with the vane when the latter and the wheel are brought into parallel relation.

3. A windmill comprising a head journaled on a vertical axis, a wind-wheel mounted on a shaft extending laterally from the head, a vane pivotally connected with the head, and a duplex furl-lever fulcrumed on the head and embodying two relatively movable and yieldingly-connected members, one of which is operatively connected with the vane and the other with the furl connection.

4. A windmill comprising a head journaled upon a vertical axis, a wind-wheel mounted on a shaft extending laterally from said head, a vane pivotally connected with the head, a duplex furl-lever embodying two relatively movable members fulcrumed on the head and one of which is operatively connected with the vane, and a governor-spring interposed between and yieldingly connecting the furl-lever members.

5. A windmill comprising a head journaled on a vertical axis, a wind-wheel mounted on a horizontal shaft projecting from the head, a vane pivotally connected with the head, a duplex furl-lever fulcrumed on the head and embodying two relatively movable members, one of which is operatively connected with the vane and the other with the furl connection, a governor-spring interposed between and connecting the furl-lever members, and means for adjusting the tension of said spring.

6. A windmill comprising a head journaled on a vertical axis, a wind-wheel mounted on a horizontal shaft projecting laterally therefrom, a vane pivotally connected to the head, a duplex furl-lever fulcrumed on the head and embodying relatively movable and yieldingly-connected members, respectively connected with the vane and the furl connection, a brake associated with the hub of the wind-wheel, and a brake-lever arranged in the path of one of the furl-lever members.

7. A windmill comprising a head journaled on a vertical axis, a wind-wheel mounted on a horizontal shaft projecting laterally therefrom, a vane pivotally connected with the head, a duplex furl-lever fulcrumed on the head and whose separate elements are respectively connected with the vane and the furl connection, and a brake, controllable from the lever element connected with the vane.

8. A windmill comprising a head journaled on a vertical axis, a wind-wheel journaled on a horizontal shaft projecting laterally therefrom, a vane pivotally connected to the head, a duplex furl-lever embodying relatively movable members, a brake associated with the hub of the wind-wheel and controllable from one of the lever members.

9. A windmill comprising a head journaled on a vertical axis, a wind-wheel mounted on a horizontal shaft projecting from the head, a vane pivotally connected to the head, a duplex furl-lever fulcrumed on the head and embodying two relatively movable and yieldingly-connected members, a weighted arm connected with one of said members, a brake associated with the hub of the wind-wheel, and a brake-lever mounted in the path of the furl-lever member which carries the weighted arm so as to be operated and released thereby.

10. A windmill comprising a head journaled on a vertical axis, a wind-wheel mounted on a horizontal shaft projecting from the head, a vane pivotally connected with the head, a separate self-acting latch pivotally mounted on the head and having a member arranged to directly engage with the vane when the wheel is out of sail, and means for moving the furl-lever against the latch to release the same.

11. A windmill comprising a head journaled on a vertical axis, a wind-wheel mounted on a horizontal shaft projecting from the head, a vane pivotally connected with the head, a furl-lever fulcrumed on the head and operatively connected with the vane, a weighted arm carried by the furl-lever, and a latch on the head adapted to lock the vane when the wheel is out of sail, a portion of said latch being arranged in the path of the weighted arm.

12. A windmill comprising a head journaled on a vertical axis, a wind-wheel mounted on a horizontal shaft projecting from the head, a vane pivotally connected with the head, a furl-lever operatively connected with the vane, a weighted arm carried by said lever, a roller carried by said arm, and a vane-locking latch adapted to be engaged by said roller, substantially as and for the purpose set forth.

13. A windmill comprising a head journaled on a vertical axis, a wind-wheel mounted on a horizontal shaft projecting therefrom, a vane pivotally connected to the head, a duplex furl-lever fulcrumed on the head and embodying two relatively movable members, one of which is operatively connected with the vane and the other with the furl connection, a governor-spring interposed between and connecting said members, and a stop on one member adapted to coöperate with the other member and limit the relative movement between the members, substantially as described.

14. A windmill comprising a head journaled on a vertical axis, a wind-wheel mounted on a horizontal shaft projecting therefrom, a vane pivotally connected with the head, a brake-band embracing the head of the wind-wheel and having a fast connection at one end, a brake-lever pivotally supported on the head and connected at one end with the free end of the brake-band, and a furl-lever fulcrumed upon the head and operatively connected with the vane, said furl-lever being arranged in the path of the free end of the brake-lever.

15. A windmill comprising a head journaled on a vertical axis and provided with a stem at its lower end, a bearing head or casing in which said stem is rotatably mounted, said casing having a flared lower end, and a bushing removably fitted in the flared lower portion of the casing and encircling said stem.

16. A windmill comprising a head journaled on a vertical axis and provided with a depending stem having enlarged bearing-collars at or near its upper and lower ends, a bearing head or casing in which the stem is journaled, said casing having a flared or enlarged lower portion, and a bushing removably fitted in the flared portion of the casing and extending around one of the enlarged bearing-collars on the stem.

17. In a windmill, a wind-wheel comprising a series of blades or wings, bands connecting the blades or wings, and duplex cross-ties connecting the spokes adjacent to one of the bands, each tie embodying overlapping members and means for securing the same to the adjacent band.

18. In a windmill, a wind-wheel comprising a series of blades, a hub, and spokes connecting the hub and blades, and a series of duplex cross-ties each consisting of overlapping members having hooked portions for engaging oppositely-arranged spokes, and fastening means for securing the tie members together.

19. In a windmill, the combination with a series of blades, and a hub embodying flanges provided with notches, and spokes having their inner ends bent and inserted in openings in the hub, the body portions of the spokes being received in the notches of the flanges.

20. In a windmill, a wind-wheel embodying a hub having oppositely-arranged flanges provided with notches, the hub being provided in radial alinement with said notches with spoke-receiving openings, and spokes having their inner ends bent at an angle and inserted in the openings in the hub, the body portions of the spokes being received in the notches of the flanges while the flanges serve to brace the spokes between the hub proper and the rim or outer portion of the wind-wheel.

21. In a windmill, the combination of a head journaled on a vertical axis, a vane having pivotal connection with the head, said pivotal connection comprising separate upper and lower pivotal points spaced a distance from each other and disposed out of vertical alinement, a wind-wheel mounted on a shaft extending laterally from said head and in a plane at one side of the vertical axis thereof, a furl-lever pivotally mounted upon the head at the side opposite the vane-mounting and having yielding connection with the vane, and locking means controlled by the furl-lever and arranged to directly engage with the vane.

22. A windmill comprising a head journaled on a vertical axis, a wind-wheel mounted on a shaft extending laterally from the head, a vane pivotally connected with the head, a latch for locking the vane when the wheel is out of sail, a duplex furl-lever embodying relative movable members, and a rod connecting one of the furl-lever members with the vane, said rod having restricted play at its point of connection with the furl-lever member.

23. A windmill comprising a head journaled on a vertical axis, a wind-wheel journaled on a shaft projecting from the head, a vane pivotally connected to the head, a furl-lever fulcrumed on the head and connected with the vane, a brake-rod associated with the hub of the wheel and having an adjustable take-up at one end of the brake-rod and a brake-lever mounted in the path of the furl-lever and operatively connected to the brake-rod.

In testimony whereof I affix my signature in presence of two witnesses.

CHARLES A. WRIGHT.

Witnesses:
Z. E. JACKSON,
H. M. JACKSON.